(12) United States Patent
Lin et al.

(10) Patent No.: US 7,692,793 B2
(45) Date of Patent: Apr. 6, 2010

(54) ANALYZING TUNABLE OPTICAL FILTERS USING TUNABLE SOURCE

(75) Inventors: Christopher Lin, El Cerrito, CA (US); Deepak Devicharan, Horseheads, NY (US)

(73) Assignee: Oclaro North America Inc., San Jose, CA (US)

( * ) Notice: Subject to any disclaimer, the term of this patent is extended or adjusted under 35 U.S.C. 154(b) by 289 days.

(21) Appl. No.: 11/998,213

(22) Filed: Nov. 29, 2007

(65) Prior Publication Data

US 2009/0141266 A1 Jun. 4, 2009

(51) Int. Cl.
*G01N 21/00* (2006.01)
*G01J 3/50* (2006.01)

(52) U.S. Cl. .................. 356/402; 356/416; 356/425

(58) Field of Classification Search .............. 356/416, 356/425
See application file for complete search history.

(56) References Cited

U.S. PATENT DOCUMENTS 7,589,840 B2 * 9/2009 Zeng ........................ 356/454
2004/0161242 A1 * 8/2004 Xu ........................... 398/149

* cited by examiner

*Primary Examiner*—F. L Evans
(74) *Attorney, Agent, or Firm*—Peter V. D. Wilde

(57) ABSTRACT

The specification describes an optical wavelength monitor/analyzer that uses a cost effective wavelength reference source. The wavelength reference source is a nominally fixed wavelength laser with inherent tunability over a very limited wavelength range, i.e. a few nanometers. Tuning is effected by changing the temperature of the laser. The limited range is useful for making multiple wavelength measurements in the context of analyzing wavelength drift in tunable optical filters.

15 Claims, 8 Drawing Sheets initial with filter error after filter analysis and correction

ANALYZING TUNABLE OPTICAL FILTERS USING TUNABLE SOURCE

FIELD OF THE INVENTION

The invention relates to optical systems using tunable optical filters, and to methods for analyzing wavelength drift or wavelength calibration errors in tunable optical filters.

BACKGROUND OF THE INVENTION

Optical tunable filters are used in optical communications systems for optical performance monitoring (OPM). Other applications for tunable optical filters, inter alia, are for optical noise filtering, noise suppression, and wavelength division multiplexing.

For the purpose of describing the invention, the focus of the description below will be on tunable optical filters used in OPM systems, and OPM systems for wavelength division multiplexed (WDM) systems. It will be understood that the invention is not so limited.

In WDM systems, the basic design assumes wavelength stability. However, a variety of dynamic changes occur due to temperature changes, component aging, electrical power variations, etc. For optimum system performance it is necessary to monitor these changes and adjust system parameters to account for them. To accomplish this, optical channel monitors (OCMs), also known as optical performance monitors (OPMs), may be used to measure critical information data for the various channels in the WDM system. OPMs may monitor signal dynamics, determine system functionality, identify performance change, etc. In each case they typically provide feedback for controlling network elements to optimize operational performance. More specifically, these tunable optical filters scan the C–, L– and/or C+L-band wavelength range and precisely measure channel wavelength, power, and optical signal-to-noise ratio (OSNR).

However, components in the optical monitors also suffer from dynamic changes, changes similar to those affecting the WDM system components being monitored. These changes may track those of the system being monitored. Consequently, absolute wavelength drift in the WDM system components may be masked.

Accordingly it is desirable to periodically calibrate the tunable optical filters in the OPMs using a fixed reference wavelength source.

Fixed reference wavelength sources typically used for this purpose are multiple single wavelength reference lasers, or tunable reference lasers. The tunable optical filter being analyzed scans the reference wavelength source(s) and the output optical power measured. Results reveal drift or other errors in the tunable optical filter calibration.

Measuring for errors at a single wavelength using, for example, a single fixed wavelength laser source, will show whether a dynamic change in the wavelength response of the tunable optical filter has occurred, and the sign and magnitude of that change. However, that approach shows only changes for the single wavelength. A more thorough analysis of a tunable optical filter requires multiple wavelength measurements. Measurements at two wavelengths provide the additional data of the slope of the wavelength shift. In many cases, it is valid to assume that the change is monotonic and linear. Thus measuring response of the filter at two wavelengths is sufficient for an effective system monitor. Measurements at more than two wavelengths show non-linear changes. For some applications that is desirable.

A wavelength reference source that allows measurements at multiple wavelengths is a tunable laser. However, tunable lasers are expensive. It would be desirable to have a method for achieving multiple wavelength measurements with a simpler and less expensive wavelength reference source.

SUMMARY OF THE INVENTION

We have designed an optical wavelength monitor/analyzer that uses a cost effective wavelength reference source. It is based on the recognition that fixed wavelength lasers have inherent tunability over a very limited wavelength range, i.e. a few nanometers. Although this wavelength range is essentially useless for typical applications requiring wavelength tunability, we have recognized that, while limited, the range is useful for making multiple wavelength measurements in the context of analyzing wavelength drift in tunable optical filters.

Tunability is effected by changing the temperature of the laser. Increasing or decreasing the laser temperature causes a modest shift in the wavelength of the laser. The preferred approach is to heat the laser. The invention also recognizes that while heating a standard laser in an operating systems is considered to be detrimental to the laser lifetime, and thus to be avoided, the analyzing laser in this invention operates only sporadically, for example, once a week, and then for a very brief period. Thus, while a conventional laser operating continuously in a heated state would typically have an unacceptable lifetime, a heated laser in this application will perform for a more than adequate period.

BRIEF DESCRIPTION OF THE DRAWING

The description of the invention below may be more easily understood when considered in conjunction with the drawing, in which.

DETAILED DESCRIPTION

Figure 1:
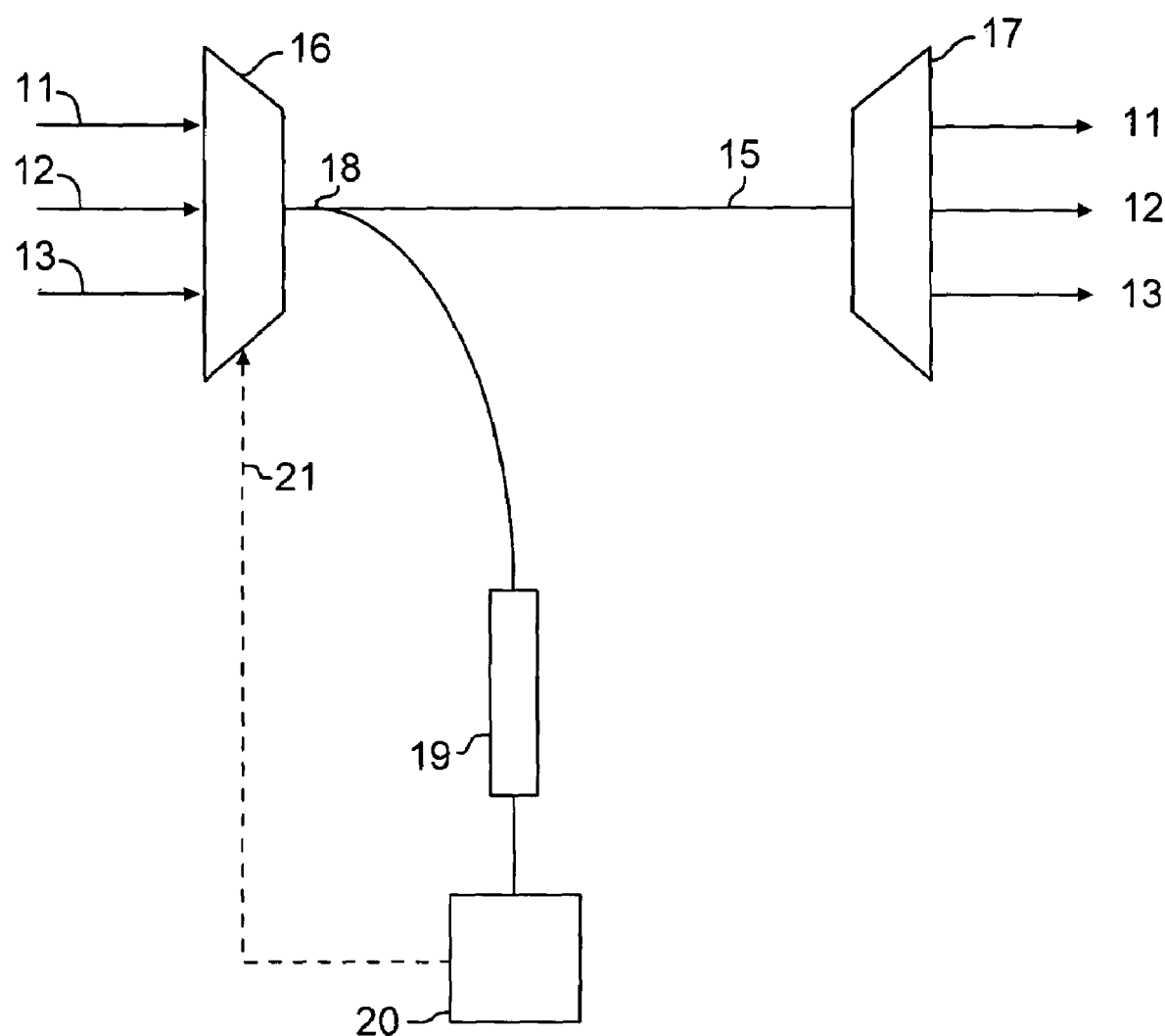
FIG. 1 is a schematic representation of a WDM system with OPM using a tunable optical filter.

With reference to FIG. 1, one approach to OPM in a WDM system is illustrated. As mentioned earlier, the description of the invention is focused on a WDM system as but one example of an application in which tunable optical filters are used for OPM, and the use of the invention to analyze and correct for wavelength drift in the tunable optical filter of the OPM. For simplicity, FIG. 1 shows three channels 11, 12, and 13. However, it is understood that typical WDM systems may have many more channels. FIG. 1 shows the transmission line 15 between multiplexer 16 at a sending site and demultiplexer 17 at the receiver. In one embodiment of OPM, the multiplexed signal is tapped, via tap 18, and the tapped signal is optically coupled to tunable optical filter 19 for analysis of the WDM signal to detect degradation. A variety of tunable optical filters are available for this application. For example, see http://www.axsun.com/html/products_omx_telecom.htm.

The tunable optical filter sweeps across all channels in the multiplexed signal, and reveals, for example, power changes in the individual channels of the signal. The power spectrum is measured by photodiode 20. Results are fed back via feedback loop 21 to the input stage for adjusting signal parameters to correct errors.

However, measurements of power changes in the WDM signal are themselves susceptible to error due to wavelength drift or other unwanted changes in the tunable optical filter 19.

Figure 2:
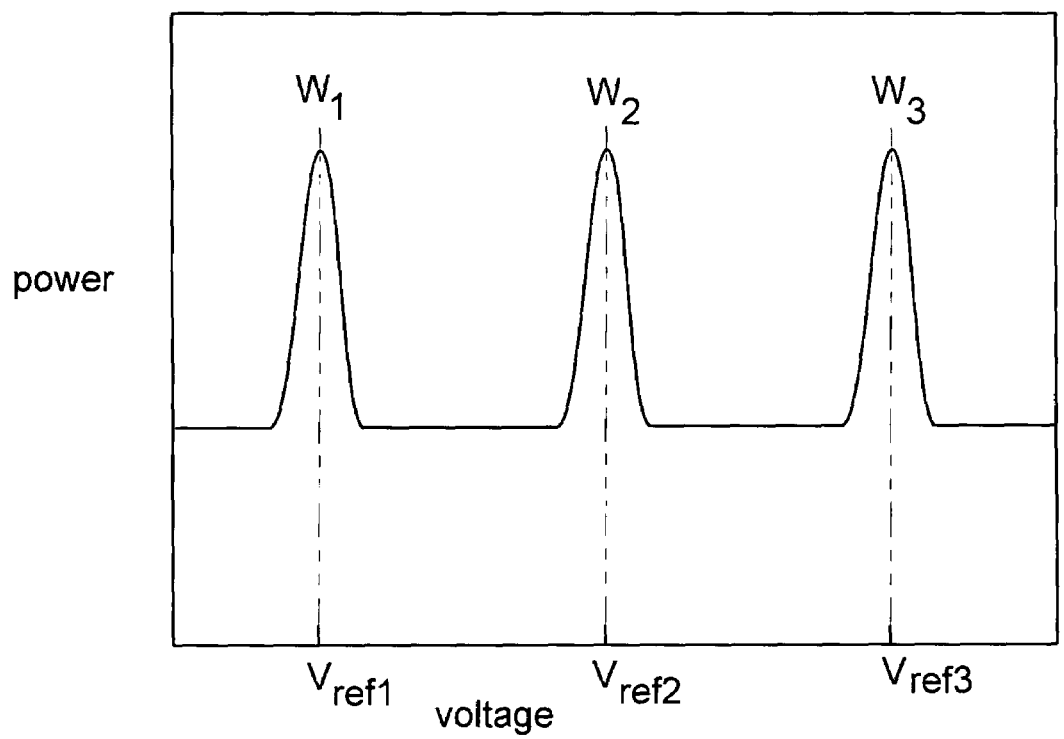
FIGS. 2 and 3 are representations showing wavelength drift in the tunable optical filter of FIG. 1.
Figure 3:
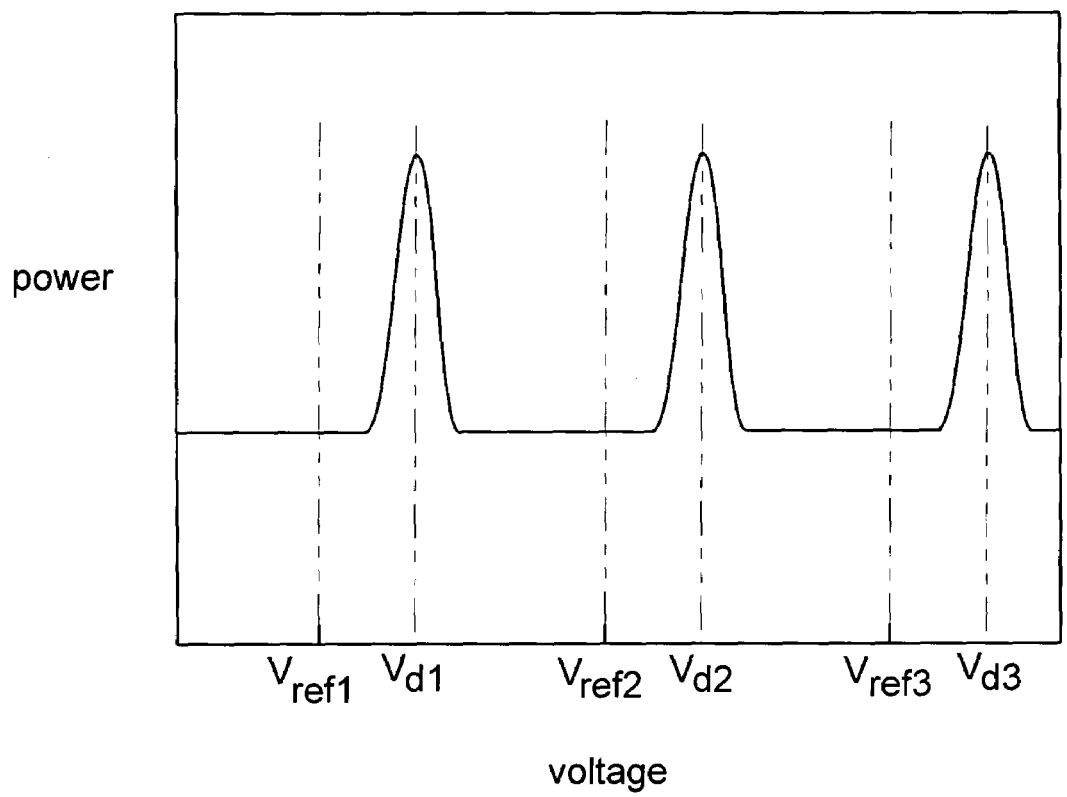

FIGS. 2 and 3 shows unwanted changes in the filter characteristics of the OPM filter. As suggested above, the power vs. wavelength curve of typical tunable optical filters may change with time. FIGS. 2 and 3 show power measured vs. voltage, as the voltage that tunes the optical filter is swept across the operative range of the filter. The voltage is calibrated to wavelengths in the optical spectrum of the filter. By way of example, for a given center wavelength for channel $W_1$, a reference voltage $V_{ref1}$ indicates the correct operating state for that channel. FIG. 2 shows the reference points in the power vs. voltage curve for the tunable optical filter. Reference voltages for the three channels $W_1$, $W_2$, and $W_3$ are designated $V_{ref1}$, $V_{ref2}$, and $V_{ref3}$. FIG. 3 shows wavelength drift in the three channels from the reference voltages to $V_{d1}$, $V_{d2}$, and $V_{d3}$. Wavelength drift may be caused by changes in the properties of the optical elements due to aging of the physical structure. Other short and long term effects may occur as well. However, in general, wavelength drift is unpredictable, and thus should be monitored and system corrections made. Note that the drift in the three channels shown in FIG. 3 is essentially the same. Such linear drift may occur for example due to an uncontrolled temperature change in the device environment.

The data shown in FIG. 3 can be ambiguous. The OPM is intended to show unwanted deviations in the WDM system. However, as indicated above, the data of FIG. 3 may be the result of unwanted drift in the OPM, specifically in the tunable optical filter. To eliminate the ambiguity the tunable optical filter may be periodically analyzed to detect and correct for drift in the tunable optical filter. The period between analyzing measurements may be any desired period, but is typically days or weeks. That period is relatively long in the context of operating optical systems, and the long period between measurements becomes important for reasons described in more detail below.

Figure 4:
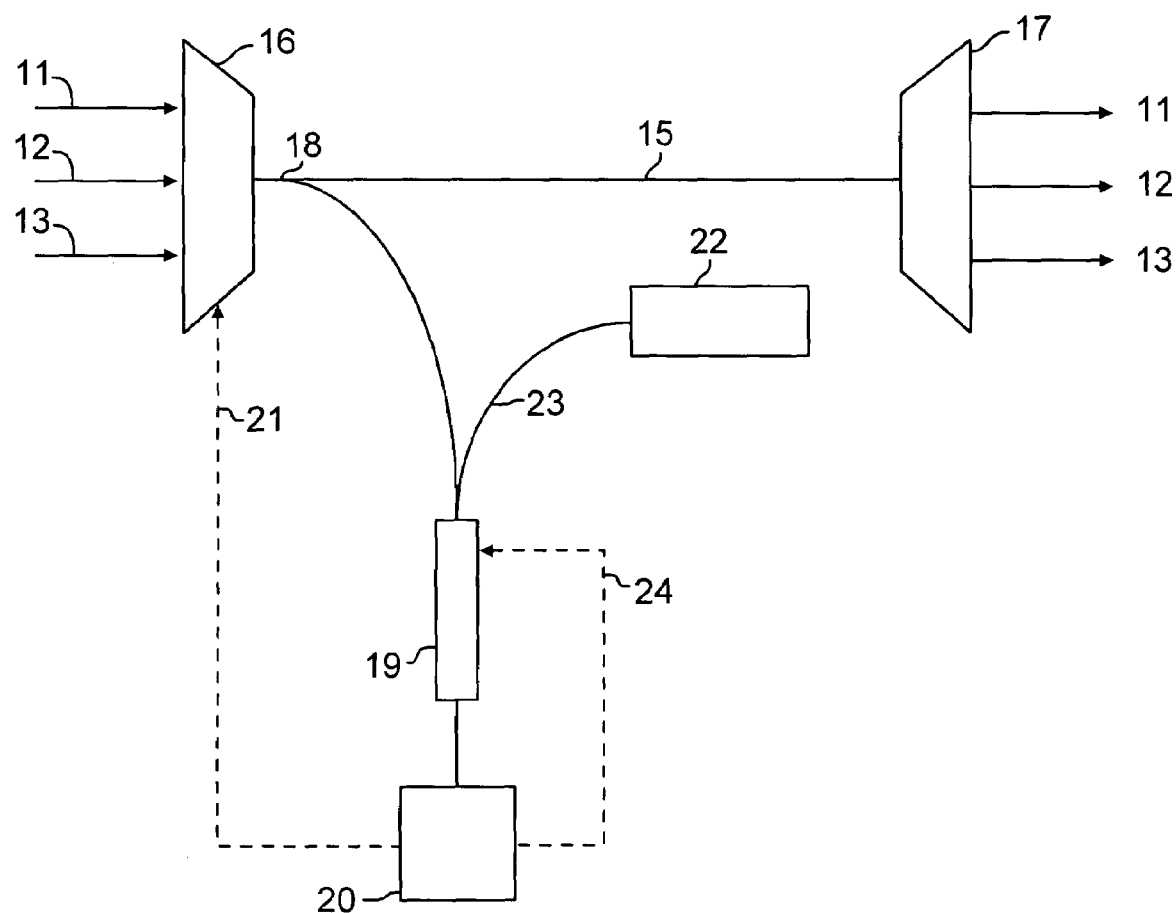
FIG. 4 is a schematic of an analyzer apparatus used to detect changes in wavelength dependent properties of the tunable optical filter of FIG. 1, and correct filter errors.

FIG. 4 shows the basic elements of the analyzer for measuring potential drift in a tunable optical filter. The drift occurs in the voltage that is indexed to a particular optical wavelength. A reference wavelength from laser 22 is optically coupled with pigtail 23 to the tunable optical filter 19. The photodiode 20 measures the optical power in the output of the tunable optical filter If errors are detected the power voltage curve is recalibrated to zero out any errors. The recalibration is represented symbolically by feedback loop 24, but may also be implemented by recalibrating the power vs. voltage curve used by the WDM system controls via feedback loop 21. Or the recalibration function may be integrated with photodiode detector 20.

Figure 5:
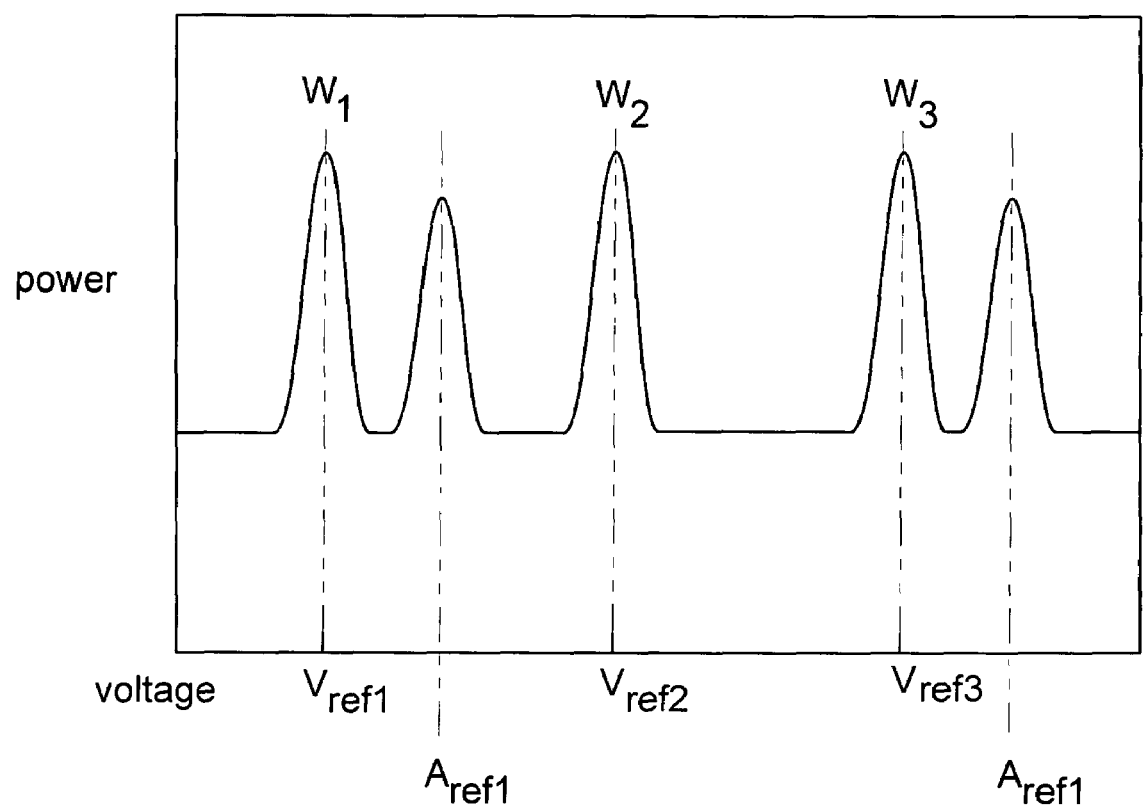
FIG. 5 shows a typical power vs. voltage curve for the apparatus of FIG. 4 when the analyzer is active, showing the power vs. voltage curve for the analyzing laser superimposed on the power vs. voltage curve from the WDM signal.
Figure 6:
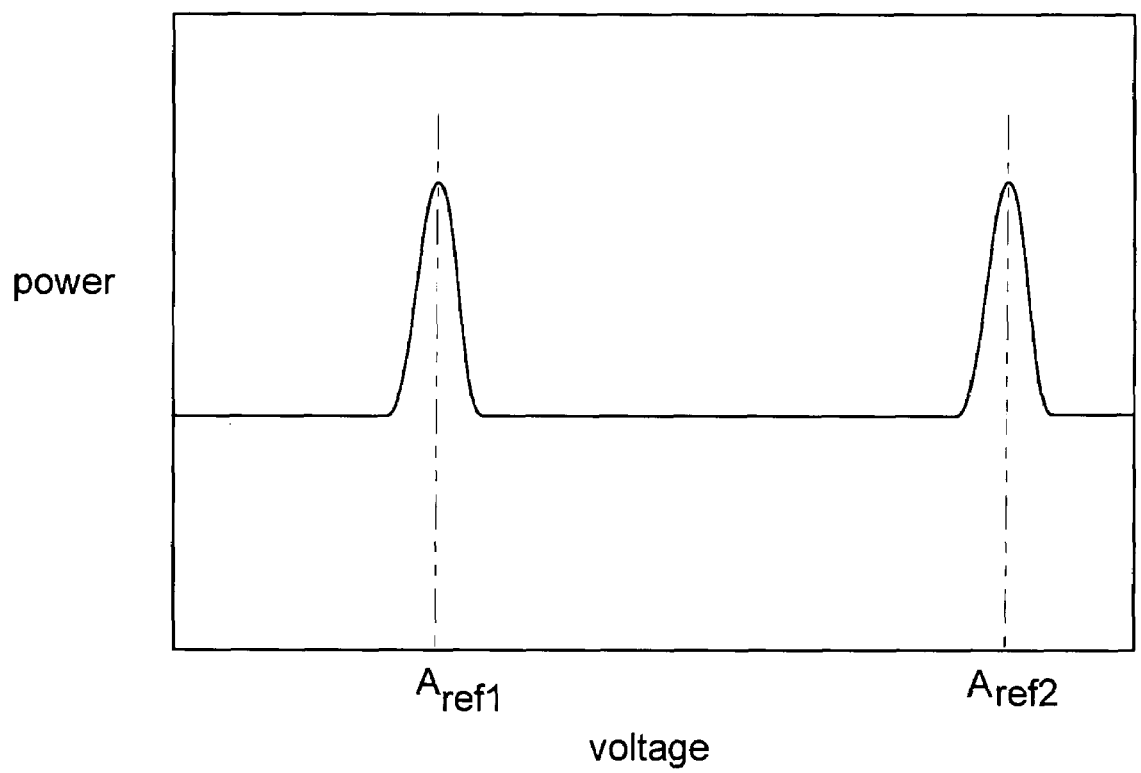
FIG. 6 shows the power vs. voltage curve for the analyzing laser subtracted from the curve of the WDM signal.

FIG. 5 illustrates a typically power spectrum read by photodiode 20 when the analyzing measurement is activated. The analyzing measurements for drift in the tunable optical filter are typically performed with the WDM system in operation, i.e. with the OPM operating. Alternatively, the OPM may be turned off while analyzing measurements are made. FIG. 5 shows a power spectrum taken while both the OPM and the analyzing measurements are activated. The power peaks from the WDM signals are designated as V values. Voltage peaks "A" appear in the voltage scan of the tunable optical filter when reference laser 22 is activated. The $A_{ref}$ values are set using initial voltage scans of the tunable optical filter. The analyzing system is based on the premise that these are reliable fixed values. The wavelength of the reference laser is reliably non-varying, in comparison with the potential drift in the power vs. voltage curve of the tunable optical filter. Any departure in A voltage from $A_{ref}$ indicates that the tunable optical filter requires recalibrating. FIG. 6 shows the A voltage spectrum with the V voltage spectrum subtracted out.

FIGS. 5 and 6 show two $A_{ref}$ peaks. These are generated using two analyzing wavelengths. How these two wavelengths are generated is an important aspect of the invention.

A single analyzing wavelength and analyzing voltage peak is useful to show the condition of drift in the tunable optical filter. However, as mentioned above, two wavelengths add important information about the nature of the drift, i.e. whether the drift is flat or tilted. Three wavelengths can reveal the condition when the power vs. wavelength curve is curved. These conditions are illustrated in FIG. 7-12. Subscripts 1, 2, and 3 show data for first, second, and third analyzing wavelengths respectively.

Figure 7:
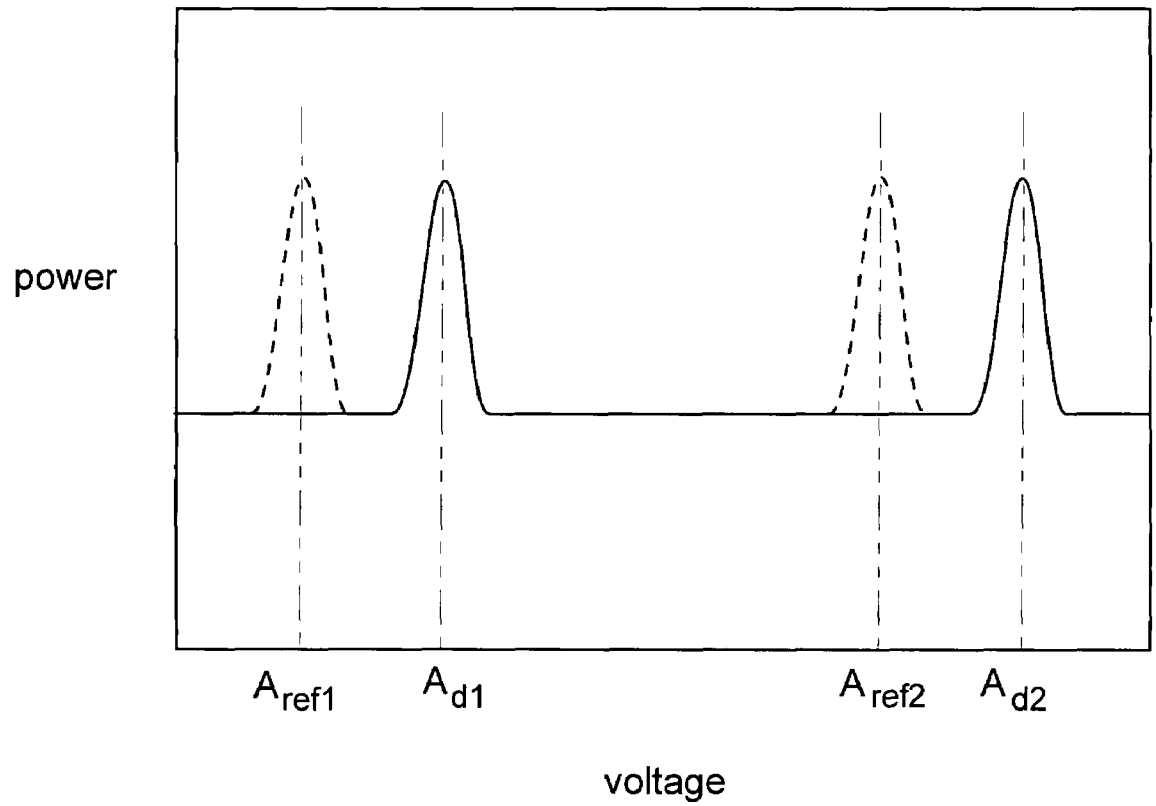
FIGS. 7 and 8 show the use of two laser wavelengths for the analyzing laser according to one embodiment of the invention.
Figure 8:
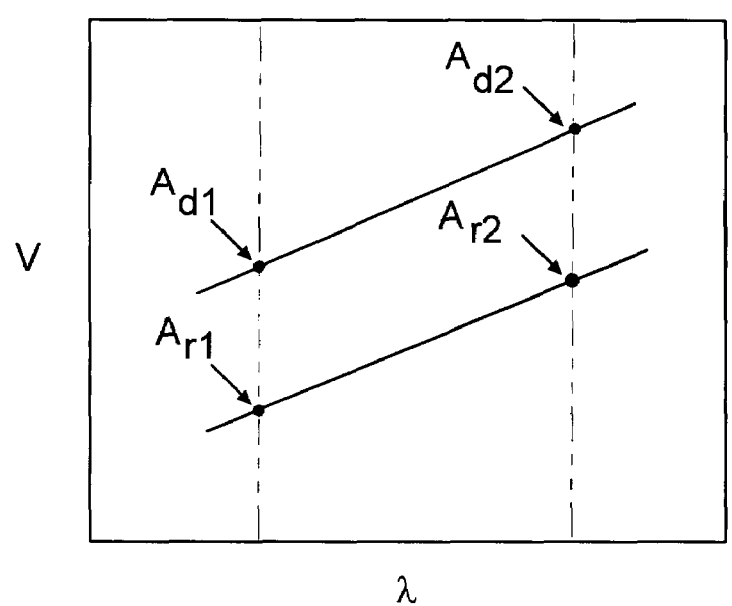

FIG. 7 shows the A voltage power spectrum for the condition where the A voltage has drifted from $A_{ref1}$ to $A_{d1}$ for one reference wavelength, and from $A_{ref2}$ to $A_{d2}$ for a second reference wavelength. As shown in FIG. 8, these data indicate that the voltage vs. wavelength relationship in the tunable optical filter has shifted linearly and flat as shown, and that recalibration of the filter reference voltages is needed. This condition is easily identified because the voltage difference between $A_{ref1}$ and $A_{d2}$ is the same as the voltage difference between $A_{ref2}$ and $A_{d2}$.

Figure 9:
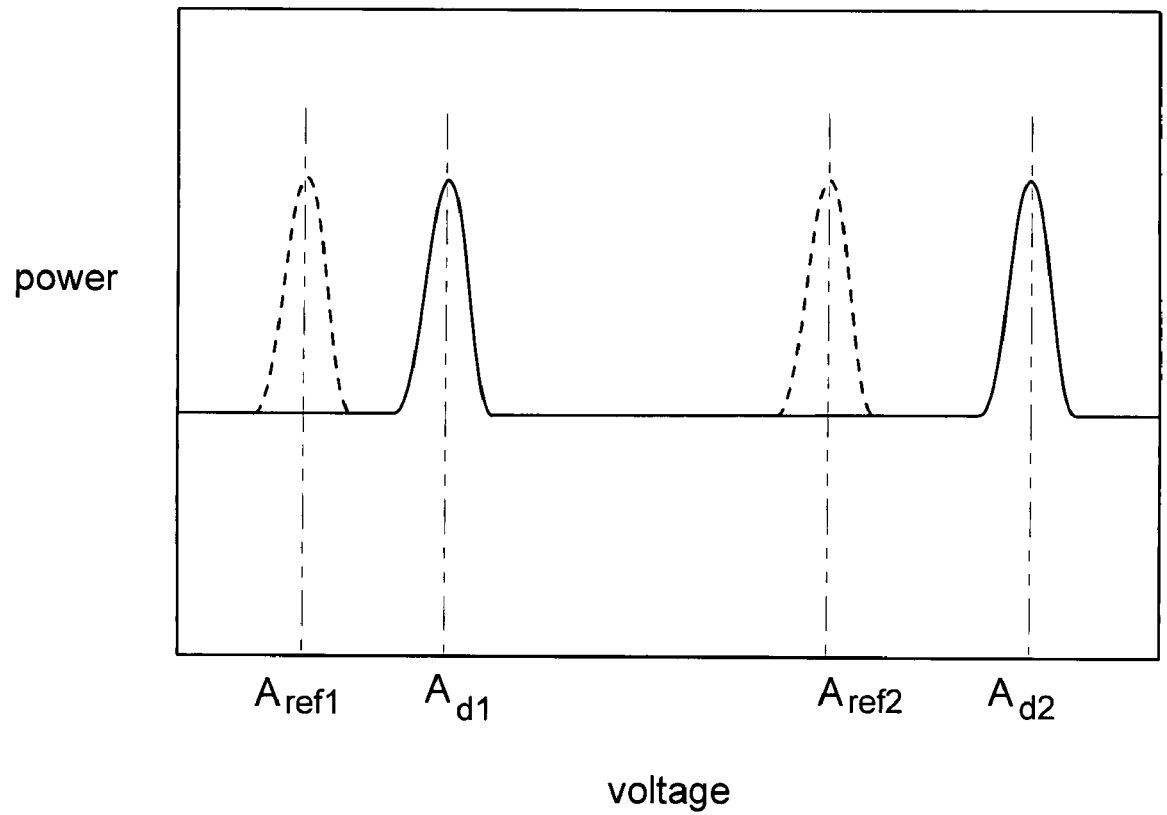
FIGS. 9 and 10 show the use of two laser wavelengths for the analyzing laser according to another embodiment of the invention.
Figure 10:
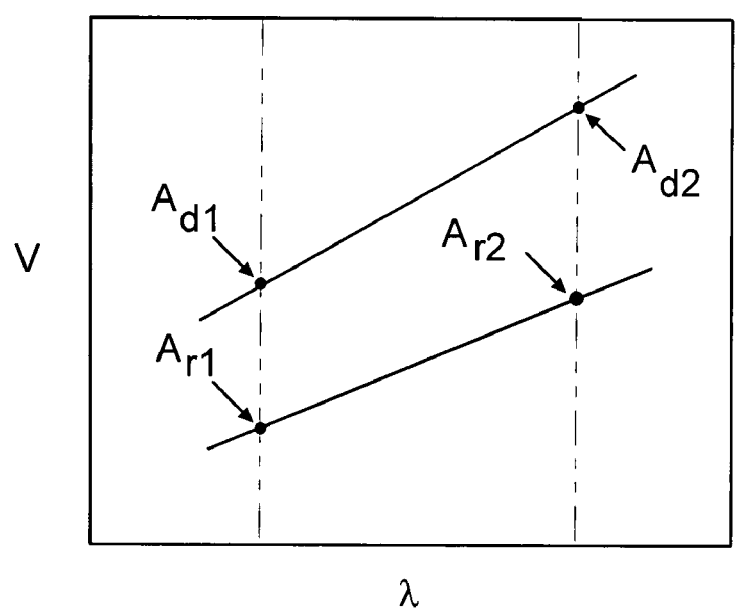

FIGS. 9 and 10 show similar results for the condition that the voltage vs. wavelength relationship in the tunable optical filter has shifted linearly, but tilted. This is revealed when the voltage difference between $A_{ref1}$ and $A_{d1}$ is different than the voltage difference between $A_{ref2}$ and $A_{d2}$.

Figure 11:
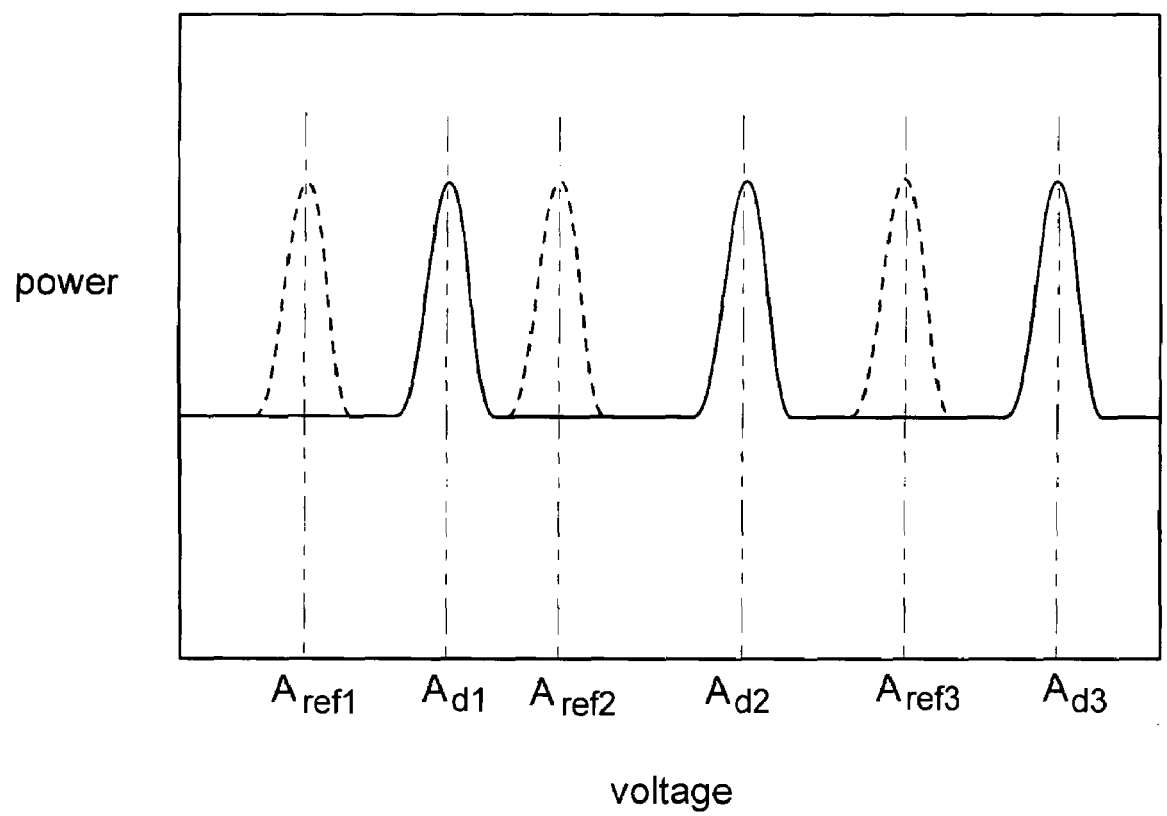
FIGS. 11 and 12 show the use of three laser wavelengths for the analyzing laser according to the invention.
Figure 12:
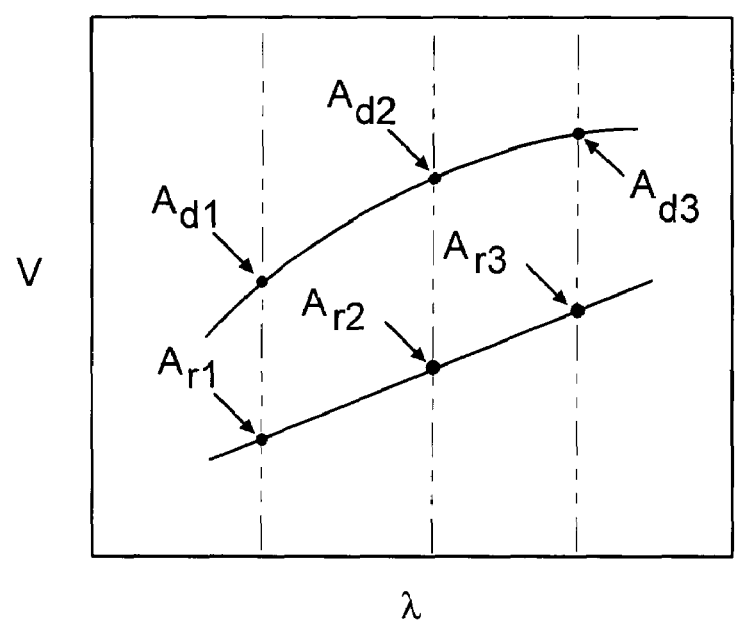

FIGS. 10 and 11 illustrate the added value of having three reference wavelengths, $A_{ref1}$, $A_{ref2}$ and $A_{ref3}$. Three wavelengths can reveal curvature in the power vs. voltage curve of the filter. This is indicated in the example shown when the voltage difference between $A_{ref1}$ and $A_{d1}$ is less than the voltage difference between $A_{ref2}$ and $A_{d2}$, and the voltage difference between $A_{ref3}$ and $A_{d3}$ is also less than the voltage difference between $A_{ref2}$ and $A_{d2}$.

According to one aspect of the invention the multiple reference wavelengths just described are provided by a single laser that is nominally a fixed wavelength laser. A fixed wavelength laser is suitable for this application based on two important understandings.

1. A nominally fixed wavelength laser can be forced to operate at a different wavelength by physically heating the laser. Heating a fixed wavelength laser by, for example, 20 degrees C. can change the operating wavelength of the laser by as much as 2 or 3 nanometers.

2. Heat is known to cause damage to lasers. In particular, the operating lifetime of lasers is much shorter at elevated temperatures than at room temperature. However, the important recognition here is that in the system and method of the invention the laser operates very sporadically in making the analyzing measurements, and then only for a few seconds for each measurement. Thus a laser with a specified CW lifetime of twenty years at room temperature would easily outlive the WDM system while performing measurements as described here once per day.

It is well understood that standard optical systems are designed to avoid temperature changes in lasers in the system for both of these reasons. Changes in wavelength of the laser due to temperature variations create errors in the system. In very high precision systems, lasers are contained in a carefully controlled thermal environment. Even standard operating optical systems are normally designed for use in an environment with temperature conditioned air. Thus the method and system of the invention, wherein a laser is deliberately heated outside of the specification range, is unusual. And the fact that the lifetime of the laser in the system is a non-factor is also important to recognize.

Figure 13:
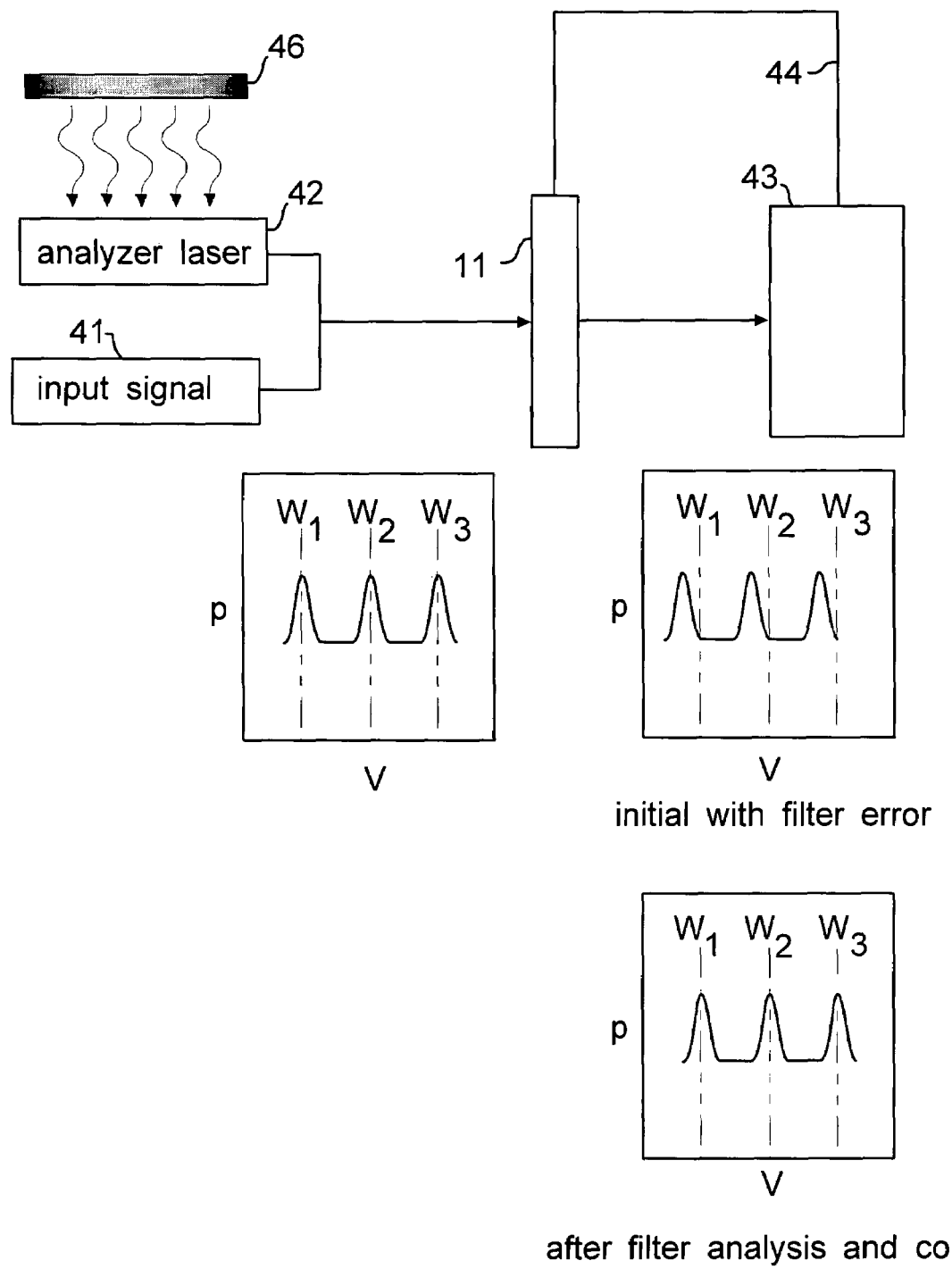
FIG. 13 is a schematic view of the analyzing apparatus of the invention.

FIG. 13 shows the apparatus of the invention. The tunable optical filter is shown at 11, with input signal 41. While the input signal described above is for the purpose of OPM in a WDM system, this illustration is meant to show that wherever an optical signal is used with a tunable optical filter the system and method of the invention may be employed to ensure the accuracy of the tunable optical filter. Referring again to FIG. 13, the analyzing laser is shown at 42, with associated heating means 46. The heating means may be a thermoelectric device. Dependence of wavelength with temperature will vary widely depending on the nature of the laser but a typical fixed wavelength laser may produce a wavelength of 1545 nm at room temperature (RT), 1546 nm at RT+10 degrees, and 1547 nm at RT+20 degrees. These values are provided for aid in explanation. In WDM systems there is unused spectrum. The laser may be tuned to specific wavelengths that are not used for signal traffic. These values would be well known to the system designer.

Lasers suitable for this application are available from Cyoptics
http://www.cyoptics.com/products/detail.asp?ProductCategoryID=3

The result of sweeping the tunable optical filter over the voltage range corresponding to this wavelength produces an output power vs. voltage curve with characteristics like those shown in FIGS. 7-12. These are measured by detector 43 and the results are used to recalibrate the tunable optical filter. The recalibration is represented by loop 44. In the context of the WDM system, the power vs. voltage curves for the three WDM channels are shown on the input side of the tunable optical filter as properly tuned to the respective center wavelengths but, due to drift in the tunable optical filter, they are shown as erroneously off center wavelength on the output side of the tunable optical filter. After activating the analyzing laser, performing analyzing measurements, and recalibrating the tunable optical filter, the three channels are shown restored to their actual reference condition.

In the embodiment shown in FIG. 4, a common detector 20 is shown for both signal wavelength detection and analyzing wavelength detection. FIG. 13 shows a dedicated detector for the analyzing wavelength. Either arrangement, or other alternative arrangement, is suitable for implementing the invention.

For the purpose of definition, a nominally fixed wavelength laser is a laser intended for operation at a fixed wavelength, i.e. $\lambda+/-0.01$ nm. As mentioned, the wavelength of this type of laser can be varied with temperature over a limited range, for example less than five nm over 20 degrees C., and more typically, less than 3 nm over 20 degrees C. For each incremental change in reference wavelength the difference between the first reference wavelength $\lambda_1$ and the second reference wavelength $\lambda_2$ will typically be less than 2 nm. To effect the incremental change the difference between the temperature used for producing the wavelength difference will typically be in the range 5-30 degrees C.

A tunable optical filter is an optical filter that can be tuned over a wavelength range of at least 10 nm by changing an electrical operating parameter of the tunable optical filter, typically voltage or current.

Although the method as described suggests varying the temperature of the laser by heating the laser, the alternative of cooling the laser from a higher to a lower temperature may also be used. Also, the temperature variations may occur over ranges including below room temperature. Thus the recitation "changing" the temperature of the laser includes cooling as well as heating, and may involve temperatures above and/or below room temperature.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Method comprising:
a) introducing a first analyzing optical wavelength $\lambda_1$ into a tunable optical filter using a nominally fixed wavelength laser operating at a first temperature $T_1$, the tunable optical filter being tunable by changing an operating parameter (parameter), and having a first calibration between optical wavelength and the operating parameter,
b) varying the parameter of the tunable optical filter,
c) measuring the optical power output from the tunable optical filter to produce a first optical power vs. parameter relationship,
d) changing the temperature of the nominally fixed wavelength laser to temperature $T_2$ to produce a second analyzing optical wavelength $\lambda_2$,
e) introducing the second analyzing optical wavelength into the tunable optical filter,
f) varying the parameter of the tunable optical filter,
g) measuring the optical power output from the tunable optical filter to produce a second optical power vs. parameter relationship,
h) comparing the first and second optical power vs. parameter relationships,
i) based on said comparison changing the calibration of the tunable optical filter.

2. The method of claim 1 wherein the parameter is voltage.

3. The method of claim 1 wherein the parameter is current.

4. The method of claim 1 wherein an additional optical signal is introduced into the tunable optical filter.

5. The method of claim 4 wherein the additional optical signal is a WDM signal.

6. The method of claim 1 wherein $\lambda_1$ and $\lambda_2$ differ by less than 2 nm.

7. The method of claim 6 wherein the difference between $T_1$ and $T_2$ is in the range 5-30 degrees C.

8. The method of claim 1 including the additional steps of:
j) changing the temperature of the nominally fixed wavelength laser to temperature $T_3$ to produce a third analyzing optical wavelength $\lambda_3$,
k) introducing the third analyzing optical wavelength into the tunable optical filter,
l) varying the parameter of the tunable optical filter,
m) measuring the optical power output from the tunable optical filter to produce a third optical power vs. parameter relationship,
n) comparing the first, second, and third optical power vs. parameter relationships,
o) based on said comparison changing the calibration of the tunable optical filter.

9. Optical system comprising:
a) a nominally fixed wavelength laser operating at a first temperature $T_1$ to produce an output, the output having first analyzing optical wavelength $\lambda_1$,
b) a tunable optical filter, the tunable optical filter being tunable by changing an operating parameter (parameter), and having a first calibration between optical wavelength and the operating parameter,
c) an optical connection connecting a) and b) for introducing the output of the nominally fixed wavelength laser into the tunable optical filter,
d) a tuning source for varying the parameter of the tunable optical filter,
e) a photodetector for measuring the optical power output from the tunable optical filter to produce a first optical power vs. parameter relationship,
f) a thermoelectric device associated with the nominally fixed wavelength laser for changing the temperature of the nominally fixed wavelength laser to temperature $T_2$ to produce a second analyzing optical wavelength $\lambda_2$, and produce a second optical power vs. parameter relationship.

10. The optical device of claim 9 wherein the parameter is voltage.

11. The optical device of claim 9 wherein the parameter is current.

12. The optical device of claim 9 further including an additional optical connector associated with the tunable optical filter for introducing an additional optical signal into the tunable optical filter.

13. The optical device of claim 12 wherein the additional optical signal is a WDM signal.

14. The optical device of claim 9 wherein the thermoelectric device operates over a range of 5-30 degrees C.

15. Method comprising introducing an optical signal into a tunable optical filter, and analyzing the performance of the tunable optical filter by steps comprising:
a) introducing a first analyzing optical wavelength $\lambda_1$ into the tunable optical filter using a nominally fixed wavelength laser operating at a first temperature $T_1$, the tunable optical filter being tunable by changing an operating parameter (parameter), and having a first calibration between optical wavelength and the operating parameter,
b) varying the parameter of the tunable optical filter,
c) measuring the optical power output from the tunable optical filter to produce a first optical power vs. parameter relationship for the analyzing wavelength $\lambda_1$,
d) changing the temperature of the nominally fixed wavelength laser to temperature $T_2$ to produce a second analyzing optical wavelength $\lambda_2$,
e) introducing the second analyzing optical wavelength into the tunable optical filter,
f) varying the parameter of the tunable optical filter,
g) measuring the optical power output from the tunable optical filter to produce a second optical power vs. parameter relationship for the analyzing wavelength $\lambda_2$,
h) comparing the first and second optical power vs. parameter relationships,
i) based on said comparison changing the calibration of the tunable optical filter.

* * * * *